US006612494B1

(12) United States Patent
Outwater

(10) Patent No.: US 6,612,494 B1
(45) Date of Patent: Sep. 2, 2003

(54) PRODUCT AUTHENTICATION SYSTEM

(75) Inventor: Chris Outwater, Santa Barbara, CA (US)

(73) Assignee: CrossOff Incorporated, Halifax (CA)

( * ) Notice: Subject to any disclaimer, the term of this patent is extended or adjusted under 35 U.S.C. 154(b) by 91 days.

(21) Appl. No.: 09/670,915

(22) Filed: Sep. 29, 2000

Related U.S. Application Data

(60) Provisional application No. 60/156,898, filed on Sep. 30, 1999.

(51) Int. Cl.[7] .................................................. G06K 7/10
(52) U.S. Cl. ......................... 235/462.04; 235/462.01; 235/462.06; 235/462.02
(58) Field of Search ...................... 235/462.01, 462.02, 235/462.04, 462.06, 375, 381

(56) References Cited

U.S. PATENT DOCUMENTS

| | | | |
|---|---|---|---|
| 4,180,204 A | * 12/1979 | Koenig et al. ............... 235/385 |
| 4,889,365 A | * 12/1989 | Chouinard .................. 235/491 |
| 4,983,817 A | * 1/1991 | Dolash et al. ............... 235/455 |
| 5,005,873 A | 4/1991 | West ........................... 283/92 |
| 5,418,855 A | 5/1995 | Liang et al. .................. 380/23 |
| 5,702,511 A | * 12/1997 | de Saint-Romain et al. ........................ 106/31.15 |
| 5,781,708 A | * 7/1998 | Austin et al. ................ 235/375 |
| 6,168,081 B1 | * 1/2001 | Urano et al. ............ 235/462.05 |
| 6,203,069 B1 | * 3/2001 | Outwater et al. .............. 283/81 |
| 6,354,501 B1 | * 3/2002 | Outwater et al. ...... 235/462.01 |

FOREIGN PATENT DOCUMENTS

| | | |
|---|---|---|
| EP | 0340898 | 3/1989 |
| GB | 2325437 | 5/1998 |
| WO | WO 97/39428 | 10/1997 |

OTHER PUBLICATIONS

Invitation to Pay Additional Fees in PCT Application No. PCT/US00/27062 Form PCT/ISA/206 (extra sheets) partial International Search conducted.

PCT International Search Report as issued in International Application No. PCT/US00/27062, Mailing Date Jul. 30, 2001.

* cited by examiner

*Primary Examiner*—Michael G. Lee
*Assistant Examiner*—Steven S. Paik
(74) *Attorney, Agent, or Firm*—Perkins, Smith & Cohen LLP; Jerry Cohen

(57) ABSTRACT

Authenticating an object includes marking the object with a mark containing at least two markers wherein each marker fluoresces when illuminated with one of UV and IR, but does not fluoresce when illuminated with visible light. The marking may be in the form of a bar code containing a number or alphanumeric codes uniquely identifying the object to be marked with the particular mixture of markers used. A spectral analysis of the marking ink or the code is used to define spectral peaks for use as part of the authentication signature. The authentication signature may be defined using the identified peaks and logical conditions imposed upon them such as minimum threshold amplitude values and ratio values among peaks. Apparatus includes a device for storing data associating the code data printed on the object, the identification of the marking ink, the authentication signature (including the logical constraints) and other data such as the position of the marking on the object, the owner of the object and date of marking.

6 Claims, 3 Drawing Sheets

Figure 4

| Ink ID | Range of bar codes | Authentication Signature | Photo/Other |
|---|---|---|---|
| 001 | 1-50,000 | F1-F2 > T1 | ABC Co. |
| 002 | 50,001-100,000 | (F1-F2)/(F3-F4) > T2 | Top of box |
| 003 | 1-100 | R1=(F1-F2) > T3 AND R2=(F3-F4) > T4 AND LL < R1/R2 < UL | Buyer/1-1-00 |
| 004 | 1-50 | LL < R1/R2 < UL AND (F5-F6) > T5 | L.A. |
| 005 | 1 |  |  |

PRODUCT AUTHENTICATION SYSTEM

CROSS REFERENCE TO RELATED APPLICATION

The application claims the benefit of provisional application Ser. No. 60/156,898 filed Sep. 30, 1999 entitled "Product Authentication System".

BACKGROUND OF THE INVENTION

1. Field of the Invention

The invention relates to a product authentication or identification system and, more particularly, to a system for marking a product with a special code and later verifying the authenticity of that product by reading the special code.

2. Description of the Related Art

Various techniques have been used to identify products in an effort to reduce counterfeiting. For collectibles such as art works and sports memorabilia, where a single item may be worth millions of dollars, a technique that is highly refined and virtually impossible to copy is desired. This is because high potential counterfeiting gains will motivate counterfeiters to invest large sums of money and resources to defeat the anti-counterfeit measure. Similarly, the high cost of implementing an anticounterfeit measure for collectibles is typically accepted by the owner or insurer, because the potential loss from counterfeiting is great.

On the other hand, for mass produced items such as apparel, CDs, and audio and video cassettes, cost is a more important factor in implementing an anti-counterfeit measure. The implementation cost must be small enough so that the cost of the protected product will not increase dramatically. Yet, the anti-counterfeit measure must be refined enough so that counterfeiters will be unable to defeat the anti-counterfeit measure in a sufficiently easy manner such that they will be able to economically produce and sell counterfeit goods.

Mass produced items also have to be protected against product diversion. Product diversion occurs when a counterfeiter acquires genuine, non-counterfeit goods that are targeted for one market and sells them in a different market. The counterfeiter does this to circumvent the manufacturer's goal of controlling the supply of his or her goods in a particular market and, as a consequence, benefits from the sales in that limited supply market or in the diverted sales market.

In one type of anti-counterfeit and anti-diversion measure, an ultraviolet (UV) ink is used to mark the product with an identifying indicia. One benefit of using the UV ink is that it is typically not visible when illuminated with light in the visible spectrum (380–770 nm), but is visible when illuminated with light in the UV spectrum (200–380 nm). Therefore, counterfeiters will be unable to tell whether the product contains a security mark by merely looking at the product when the product is illuminated with visible light.

A number of UV inks are readily available in the security industry and can be obtained at a relatively low cost. Several UV ink types and compositions are described, for example, in U.S. Pat. No. 5,569,317, entitled "Fluorescent and Phosphorescent Tagged Ink for Indicia" the disclosure of which is incorporated by reference herein. This patent discloses a security mark that becomes visible when illuminated with UV light having a wavelength of 254 nm.

However, the use of security marks containing a UV ink has seen increased use and counterfeiters have become knowledgeable about their use. It has been a common practice for counterfeiters to examine the UV ink from a product sample, reproduce or procure the same or similar UV ink that matches the characteristics of the UV ink from the product sample, and apply the same security mark on the counterfeit products using the substitute UV ink.

In another type of anti-counterfeit and anti-diversion measure, an infrared (IR) ink is used to mark the product with an identifying indicia. As with the UV ink, one benefit of using the IR ink is that it is typically not visible when illuminated with light in the visible spectrum, but is visible when illuminated with light in the IR spectrum (800–1600 nm). An additional benefit of using the IR ink is that it is more difficult to reproduce or procure the matching IR ink by studying a product sample containing the IR security mark. Examples of IR security mark usage are given in U.S. Pat. No. 5,611,958 and U.S. Pat. No. 5,766,324. The disclosures of these patents are incorporated by reference herein.

Combination security marks have also been proposed. In U.S. Pat. No. 5,360,628 and U.S. Pat. No. 5,599,578, the disclosures of both of which are incorporated by reference herein, a security mark comprising a visible component and an invisible component made up of a combination of a UV dye and a biologic marker, or a combination of an IR dye and a biologic marker is proposed. Also, in U.S. Pat. No. 5,698,397, the disclosure of which is incorporated by reference herein, a security mark containing two different types of up-converting phosphors is proposed.

The detection of invisible security marks is performed automatically using a photodiode, for example, or manually by observing the fluorescence that results from illumination with a UV or IR light source. Sometimes, an invisible security mark is printed as an invisible bar code, as in U.S. Pat. No. 5,502,304, U.S. Pat. No. 5,525,798, U.S. Pat. No. 5,542,971, and U.S. Pat. No. 5,766,324, and is read using a bar code reader.

In the conventional product identification systems described above, the security mark emits light in a predetermined range of wavelengths in response to an excitation light. These systems are secure, because a counterfeiter does not generally know that a security mark exists, where it is applied, or how to excite it. However, once the counterfeiter gains access to this information, security is compromised, because the counterfeiter would be able to duplicate the security mark by using a phosphor that emits light in the same range of wavelengths.

SUMMARY OF THE INVENTION

An object of this invention is to provide a product authentication or identification system that offers a greater level of security that than the conventional systems.

This and other objects of the invention are achieved with a product authentication or identification system that uses a mark containing mixtures of optical components so that when the mark is excited, it fluoresces and emits light across the spectrum. In this system, even if the counterfeiter learned how to reproduce the excitation light and where to aim the excitation light, the counterfeiter would not be able to duplicate the security mark, because he or she would not know which part of the spectrum carried the authentication signal.

Another advantage of the invention is that the marking and detecting processes described below are non-destructive and dry.

Additional objects, features and advantages of the invention will be set forth in the description of preferred embodiments which follows.

BRIEF DESCRIPTION OF THE DRAWINGS

Embodiments of the invention are described in relation to the drawings in which.

DETAILED DESCRIPTION OF THE PREFERRED EMBODIMENTS

The major processes of a product authentication or identification system include marking a product with a special mark, maintaining a database containing a description of the marked products and the location and output characteristics of the special marks applied to the products, and reading the special mark on various products to verify the authenticity of the products. These processes, as carried out by the present invention, are described separately below.

Marking

Figure 1:
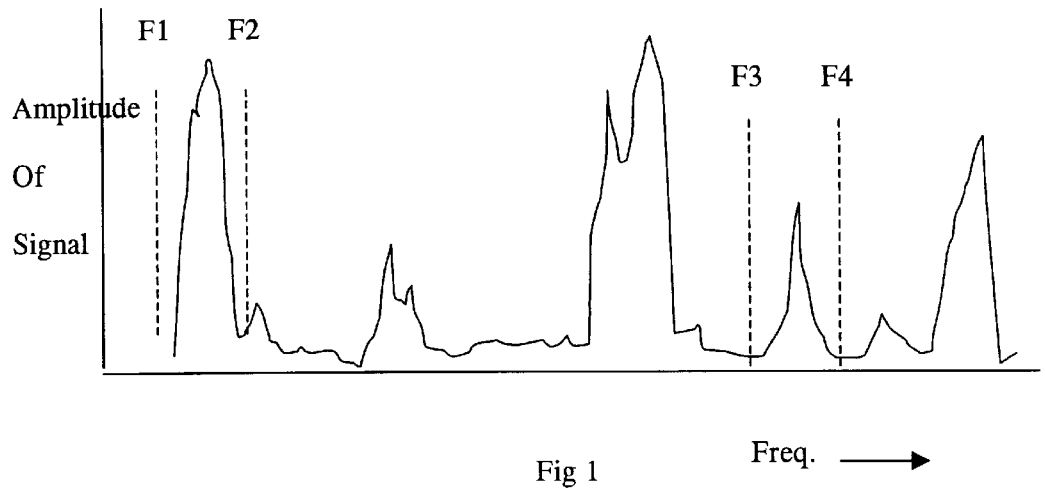
FIG. 1 represents a waveform signature of the frequency spectrum for a mixture of markers used in a code in accordance with embodiments of the invention.

The invention will be described below using a mark that is approximately ⅛" high by ½" wide. The ink that is used to form the mark is preferably invisible (i.e., a clear security ink or covert, i.e., not visible with the naked eye when it is exposed to light in the visible spectrum, and is selected from one of several ink reservoirs, each of which holds a unique combination or mixture of rare and secure optical components or taggants. When the optical components or taggants in the ink are excited, they fluoresce and emit light across the spectrum, covering at least one of the ultraviolet (UV), infrared (IR), and visible light spectra, and even possibly the X-ray spectrum. A biological DNA marker may also be incorporated into the clear ink. The authentication signal, i.e., the signal that is used to verify the authenticity of the product bearing this mark, is contained in a predefined part of this spread spectrum. An example of a spectrum or light "signature" in is indicated in FIG. 1 which shows the amplitude of the light as a function of frequency as measured by a frequency analyzer. The authentication signal may be set to any one or more frequency ranges surrounding expected peaks. In FIG. 1, the frequency range F1–F2 is used so that if a peak above a certain preset threshold is detected within this frequency range the authentication signal will be determined to be present. Therefore, a counterfeiter who is trying to duplicate this mark will not be able to know which part of the light output spectrum to replicate in order to successfully counterfeit the mark. In this connection, it is pointed out that the spectrum in FIG. 1 is the composite spectrum for a specific blend of markers within the clear ink. The range of values shown in FIG. 1 may extend to and through, visible, UV, IR and X-ray. Moreover, two or more peaks may serve as the authentication signature such as peaks within the range F1–F2 as well as F3–F4 each having its own, and generally different threshold. As further security, the relative intensity of two peaks, each resulting from different markers selected from the group of visible, UV, IR, X-ray markers may be additionally or alternatively used as the authentication marker. This use of the ratio of two peaks within the respective frequency ranges F1–F2 and F3–F4 may be used to determine the presence or absence of the authentication signal. In the extreme example of secure marking, the entire signature may be used as the authentication signal so that a match exist only if all of the peaks within each given frequency range match up as well as the relative amplitudes of the signals associated with each of the peaks.

In a preferred embodiment, a first marker will be selected to provide one peak within the visible range and a second, different marker will be used to provide another peak within an invisible range (i.e., a range selected within one of IR, UV and X-ray). In this manner a counterfeiter will think that he/she has discovered the mark when a visible fluorescence is observed and will not think to look for additional authentication signals in the invisible spectral ranges.

Any combination or mixtures of optical components or taggants (i.e., markers) may be used in the invention so long as they fluoresce and emit light across the spectrum when they are excited. For example, the marking site may have an inventory of about 5–30 or more of such ink combinations or mixtures, each of which produces a different light output signature spectrum and each of which has at least one authentication signal located in a particular portion of the light spectrum. The authentication signal location for each of the ink combinations or mixtures is preferably defined when the ink combinations or mixtures are created and stored in a database.

In an embodiment of the invention, each ink combination or mixture is contained in an ink reservoir or cartridge that is configured to fit in a bar code printer. The bar code printer may be, for example, a thermal ribbon printer that is described in U.S. Pat. No. 5,946,020, entitled "Method and Apparatus for the Maximization of Print Quality in a Multipass Thermal Printer Ribbon," the contents of which are incorporated by reference herein. Other types of bar code printers may be used so long as they are equipped with random access print heads. The random access print head of the thermal ribbon printer is able to thermally transfer a desired image of a bar code from a thermal printer ribbon onto an object. In an embodiment of the invention, the bar code image is transferred from the thermal printer ribbon onto a silicon transfer pad, and the silicon transfer pad is subsequently pressed against a product to transfer the encoded image to that product.

Each ink reservoir is pre-assigned a discrete number of codes, for example, codes representing numbers 1 to 50,000 may be assigned to the first ink reservoir, numbers 50,001–100,000 may be assigned to the second ink reservoir etc. The format for the code that is generated may be one of many commercial codes, such as bar code formats, e.g., bar code 39, or it may be a customized code format.

Each ink reservoir is also identified by a numerical code and a bar code. A bar code reader that is equipped on the bar code printer scans the bar code printed on the ink reservoir to distinguish it from the other ink reservoirs that are used in the marking process. When an operator selects one of the ink reservoirs, based on the numerical code, and inserts it into the bar code printer, the bar code reader equipped on the bar code printer automatically scans the bar code to identify the ink reservoir that has been inserted. Based on this identification, the bar code printer will know which set of discrete codes can be printed with this ink reservoir.

The bar code printer also prompts the operator to snap a photo image, preferably digital, of the item to be marked. The photo includes a physical indicator of where the mark was applied. The printer then asks the operator to input the number of items that will be marked. If the number is inputted as 50, the bar code printer will print 50 items with the same bar code before prompting the operator for a new photo of the next item to be marked. The new photo is taken to record either a new location for the mark or a different item being marked. The printer also prompts the operator to input his or her name, date and time, and any special notes about where and how the items were marked. If the operator desires that each item be marked with a different bar code, the operator would input the number as 1.

The bar code printing may take place directly onto a label for transfer to an object to be marked or in some cases, directly upon the object itself. In another embodiment, the operator takes a clean silicon transfer pad and presses the pad against the random access print head of the bar code printer to ink it with the ink mixture and the code generated by the code printer. The operator then transfers that code from the pad to an object. The scanning to the code to determine the spectral signature to be stored may take place after the code is placed on the object or from a test label printed prior to or after marking the desired objects. When the code is stored after being placed on the object, the object then gets placed under a scanner and is scanned with light sources across the spectrum, covering the UV, IR, and visible light spectra, and even the X-ray spectrum. The series of images are stored and correlated with the unique code that was printed on that object. The series of images is then added to a central database. When a large number of items are to be marked, it is not necessary to scan each item for storage since the spectral signature need only be stored once of all of the items marked within the group of objects marked with the same authentication mark.

Figure 2:
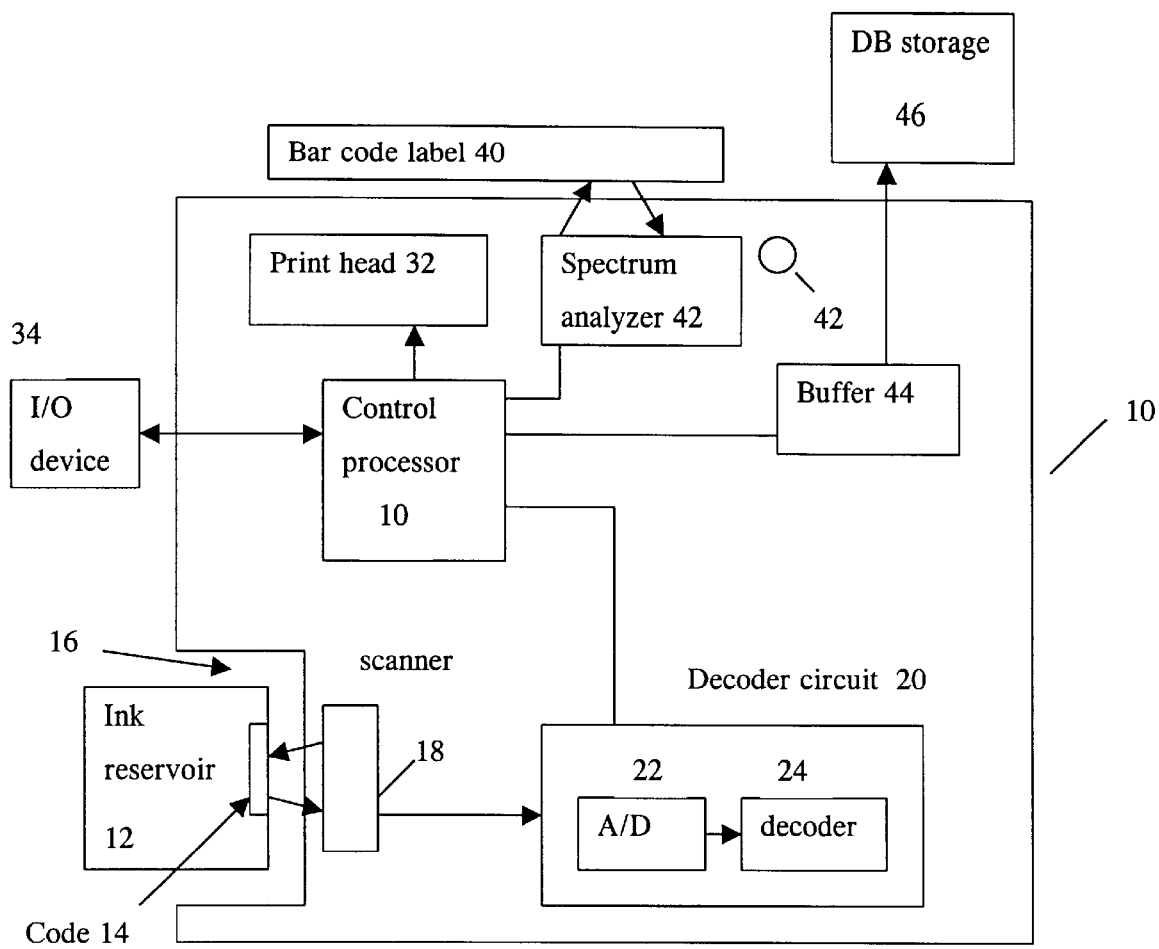
FIG. 2 is a block diagram of a printer apparatus used to produce the bar code labels and to store spectral signatures in accordance with embodiments of the invention.

The above described printing device is illustrated in FIG. 2. As shown in FIG. 2 a printer 10 is seen to receive an ink reservoir 12 containing a bar code 14 for identifying the unique mixture within the ink reservoir 12. The ink reservoir 12 is inserted into a recess 16 within the housing of the printer 10. The printer 10 contains a bar code scanner 18 for scanning the code 14 on the reservoir 12 and a decoding circuit containing an A/D converter 22 and a decoder 24. The decoding circuit 20 receives the analog signal from the scanner, converting it into digital form, and decoding the signals to provide a numeric code value to a control processor 30. The control processor 30 controls print head 32 for printing a plurality of groups of bar codes or other codes onto the objects to be authenticated. The control processor 30 may be a microprocessor having a memory for storing a look up table (LUT) for correlating the decoded bar code label from the decoding circuit 20 with a group of discrete codes that are to be printed using the ink reservoir 12 just scanned. For example, the first used ink reservoir may be used to print bar codes (or other codes) numbered 1–50,000 and a second ink reservoir may be used to print bar codes (or other codes) numbered 50,001 to 100,000 or some lesser or greater number as previously stored into the LUT.

An input/output (I/O) unit 34 is coupled to the control processor 30 to provide a means of writing into the LUT and to provide a mechanism to store other data to be correlated in the database with the objects being marked. For example, the I/O may also include a digital camera, which takes a picture of the object being marked to identify the location of the bar code or other code being printed onto the object by the print head 32. This picture may be useful since the code, in a preferred embodiment of the invention is not visible with visible light and may or may not be visible when irradiated with UV, IR and/or X-ray. Thus, it is useful to know where to look on the object being marked especially when no visible light can be detected even when the object is illuminated with UV, IR and/or X-ray. Alternatively, a description of the location of the bar code or other mark may be inserted by the operator using a keyboard as part of the I/O device 34.

The bar code or other marking may be printed on a label 40 or other transfer medium for subsequent transfer to the object to be authenticated. In order to store the correct spectral signature of the object, a spectral analyzer 42 is provided as part of the printer 10, or may alternately be separate from the printer 10. In either case, the label is irradiated with one or more of UV, IR and X-ray, from light source 42a depending on the mixture of markers used in the reservoir in question, and the reflected light is sent to spectral analyzer 42 where the spectrum is determined and digitized and sent to the control processor 30 for storing in an association table within the memory of the control processor 30. The association table is used for associating the spectral signature with the code number just printed on the label 40 and with other data such as a picture of the object to be marked showing the location of where the mark is to be placed, and other data as desired such as the name of the operator, the plant or facility where the marking is taking place, the intended geographic destination of the object, the intended owner of the object or channel of commerce through which the object is intended to move, the date of marking and other special notes or data.

The data in the association table is sent through a buffer 44 to a data base storage unit 46. The data base storage unit 46 may store a large amount of data within the association table now stored in the large memory of the database. To save storage space, the entire spectral signature from the spectrum analyzer need not be stored, especially when only one or two peaks (and/or their ratio) is to be used to provide the authentication signature. In such cases, it is only necessary to store the frequency range for the peaks which are used in the signature, threshold values and ratio values as will be made clear by the description below.

Figure 3:
FIG. 3 is an example of an association table wherein various data is stored in an associated fashion for storage, for example, in a data base.
Figure 3:

An example of the association table stored in the database 46 is shown in FIG. 3. In this table, The identification (ID) of the various ink reservoirs indicating the mixture of markers used is shown in the first column and are sequentially labeled for ease of explanation. In ID 1, there are 50,000 items to be marked sequentially with the numbers 1–50,000, and the signature is simply the existence of a spectral peak within the frequency range F1–F2 wherein the spectral peak is greater than a preset threshold T1. The right hand column is reserved for photo identification of the marked product or other data of interest. For the first example, this data field is filed with the name of the company, ABC Co., which is the retail company purchasing the marked items. The peak within the frequency range F1–F2 may correspond to a particular marker or taggant within the ink and this marker has fluorescent properties to produce the desired peak. The concentration of the marker within the ink and the amount of ink placed on the label, and the substrate will determine the amplitude of the peak. This amplitude is controlled so that an authenticate mark will only be determined if the peak amplitude is above a preset threshold, T1. The example ink ID number 1 uses only one peak from one marker. However, the one peak may also be produced by the resulting summation of two peaks within the frequency range F1–F2 where each peak results from a different marker. In this case the relative concentration of each marker within the ink reservoir will determine the width of the peak as each marker will have a different amplitude response to the illuminated UV and/or IR light.

Such a composite peak within a fairly narrow frequency range makes counterfeiting especially difficult.

In alternative embodiments similar to example 1 above, the marker produces only one peak used for the authentication signature but the ink mixture contains multiple markers each having its own plurality of peaks. The existence of multiple peaks makes it difficult for a counterfeiter to know which peak is considered the authentication signature and the counterfeiter must thus reproduce all the peaks to be sure of defeating the system.

In ink ID number 2, the bar code range is set to print sequential numbers 50,001 to 100,000 but this time the signature is the existence of the ratio of the peak defined within the frequency range (F1–F2) to that defined within the frequency range (F3–F4) wherein the ratio is greater than a preset threshold value T2. Preferably, the peak within the frequency range F1–F2 results from one marker or taggant within the ink reservoir while the peak within the frequency range F3–F4 results from another, different marker or taggant within the same ink reservoir. The existence of two markers from different fluorescent constituents of the ink, and with a certain relative concentration (resulting in different peak heights) makes it difficult for a counterfeiter to determine the true authentication signature. The data stored in the right hand column is the location of the mark here indicated at the top of the box where the object to be marked is assumed to be a box.

In ink ID number 3, the bar code prints sequential numbers 1–100 and the authentication signature consist of the existence of two peaks, the first within a range R1 defined between frequency values F1 and F2 and the second R2, defined between frequency values F3 and F4. A threshold is set for each peak separately such that R1>T3 and R2>T4 where T3 and T4 are threshold values. In addition there is a requirement that the ratio of the peaks satisfy a certain range of values such that this ratio is between a lower limit, LL, and upper limit, UL. In this case the data in the right most column contains the buyer's name and the date of purchase.

For the case of ink ID number 4, three peaks are involved for marking a relatively small number of objects, namely 50 items. In this case the same test used in ink ID number 3 is used for ration R1 and R2 and additionally, another peak is required to be present between frequency values F5 and F6 and this peak is required to be above a preset threshold value of T5. The right hand data column is used to store a location data, in this case Los Angeles (LA) indicating the source of the marking facility.

Finally, in the example of ink ID number 5, only one item is to be marked such as a very unique item or a one-of-a-kind item. In this case, the authentication signature may be a full or partial spectrum of the analyzed light from the spectral analyzer and the authentication would require a match between the measured signature and the stored signature, peak for peak. Such an authentication signature is clearly reserved for expensive or unique items. In this case a photo of the item being marked may also be stored in the database and an area on the photo may be marked to identify the location of the authentication marking.

In an alternate embodiment of the printer 12, the light source 42a may illuminate the ink (and subsequently the markers) within the reservoir 12 and the spectral analyzer 42 may be used to collect and analyze the data directly from the ink reservoir without having to first print the code or marking onto the object or intermediate transfer medium. In this manner the peaks of interest may be defined and stored in the association table within the database 46. Further, the spectral analysis may take place within a separate stand alone analyzer into which a sample of the marking ink is placed, and the marking ink may be identified on the display of the spectral analyzer by means of a keyboard for permitting the operator to enter identifying data (e.g., alphanumeric indicators) for identification in a conventional manner. In either case, the operator may set the ranges around the peaks of interest as shown in FIG. 1 for storing the frequency ranges of interest rather than the entire frequency spectrum as discussed above.

In the above examples, it is pointed out that the code itself is invisible when illuminated with visible light. The code contains data indicative of a unique number associated with the object and the spectral signature serves to verify the authenticity of the mark to a high degree of accuracy. Of course, the item to be marked need not necessarily have a unique number associated with it and in some cases it is sufficient if the markings merely serve to verify that the item is authentic. In such cases, the association table need not contain the second column and the marking need not be in the form of a bar code. The marking can take on any shape and it is only important to know in advance where the marking appears on the object or to have this information supplied by the association table.

The bar code printer also signals the operator to change the ink reservoir and automatically indicates to the operator the numerical code of the new ink reservoir to insert. The operator inserts the new ink reservoir, and the bar code printer reads the bar code that is printed on the new reservoir and begins to print objects with one or more bar codes pre-assigned to that ink reservoir.

Upon completion of the automatic bar code printing with the new reservoir, the operator, in an embodiment of the invention using a silicon transfer pad, takes a clean silicon transfer pad and presses the pad against the random access print head of the code printer to ink it with the ink mixture and the code generated by the code printer. The operator then transfers that code from the pad to an object. The object then gets placed under a code scanner where it is scanned with light sources across the spectrum and a series of images are stored and correlated with the unique code that is printed on that object. The series of images is then added to the central database.

A secure intranet connection to the database is provided so that the marking work progress can be accessed remotely at any time. Further, a surveillance camera may be installed at the marking site and connected to the intranet so that an overview of the marking operation can be viewed remotely.

The marked objects are then delivered for distribution. Each object has been marked with a unique bar code and correlated to a unique ink mixture, and placed into the central database.

Database

The list below summarizes the information that is kept at a central database and accessible by a secure intranet connection, examples of which are shown in FIG. 3. The authentication signal location for each of the ink reservoirs is defined when the ink reservoirs are created and stored in the database at that time. Other inputs to the database are made by the operator during the marking process. The database is accessed during the detecting process to verify the authenticity of the marked product.

1. The location of the authentication signal within the spread spectrum response for each of the ink reservoirs.
2. Identity of the ink reservoir and valid bar codes pre-assigned to that ink reservoir.
3. Digital image of the product showing the location of the authentication mark and the corresponding inputs about the number of products marked, the operator's name, date and time, and special notes.
4. Series of output images, each output image representing the spread-spectrum fluorescence response of the authentication mark when excited by a light source of a particular wavelength.
5. Identification of ranges of frequency values representing peaks which must exist in the spectrum from the frequency analyzer and/or ratios of ranges meeting certain threshold criteria.

Reading

The reading or detecting of the mark is conducted on several levels. The first level of detecting is done in the field and completed within seconds. The second and third level of detecting is done in a laboratory and completed within minutes.

For field-level detecting, UV or IR code readers are used. The responsibility of the operators in the field would be to match the code on the object with the ink reservoir that was used to print that code. For example, the code may not only encode the numerical value shown in the second column of the association table of FIG. 3, but may also encode the ID number of the ink reservoir used to produce the code. In this manner the ink ID number may be used to check that the code number read is within the range of codes that was used by that ink ID reservoir. To be able to locate the authentication mark containing the code in the field, the operator would shine a diffuse source of UV light on the object to locate the code.

For laboratory detecting, the authentication mark is scanned with light sources across the spectrum and the light output signal at the location of the authentication signal is compared with the series of images or defined image peaks and/or ratios that are stored in the database.

Figure 4:
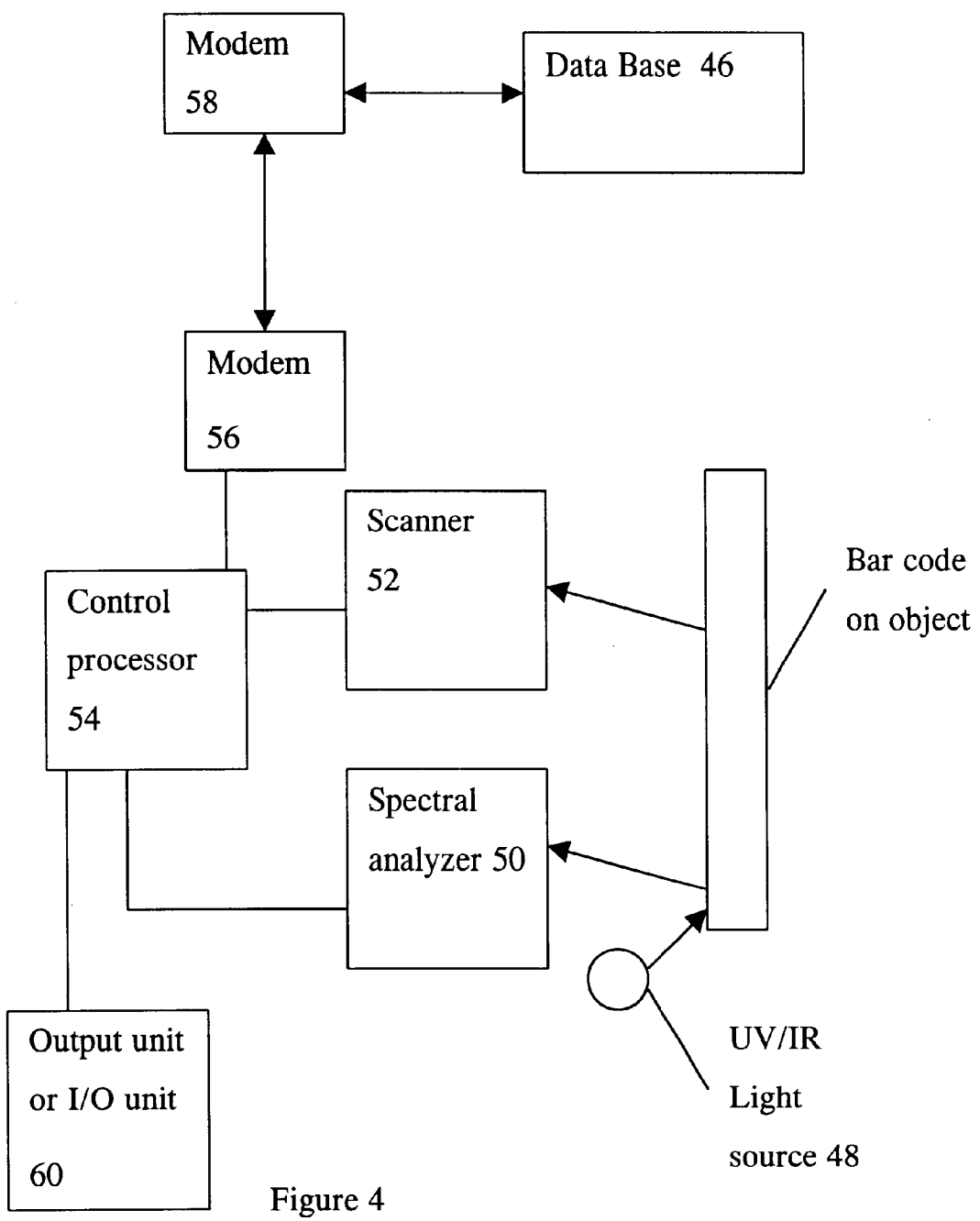
FIG. 4 is a block diagram of a remote access system for accessing a data base containing previously stored authentication signatures for comparing same with scanned codes and spectral data from an object being authenticated.

In some situations, field spectral analysis may also be performed so that the full authentication may be done remotely. An example of this embodiment of the invention is illustrated in FIG. 4. The label of the object under test is illuminated with a one or more of a UV and IR light source 48 at a location known in advance by the person checking authenticity. Flood illumination with UV may be used in the location is not known since such a flood illumination will reveal any UV code over a wide area of an object. Alternatively, the user may access a central database or Intranet site, and after giving the proper password, may have access to the code location data after identifying the object under test. At any event, the light reflected from the code is read by analyzer 50 and bar code scanner 52 and the read data is fed to a control processor 54 which stores the data and sends out a request via modem 56 and 58 to the data base 46. Access may be via the Internet, Intranet with password verification. The field operator may confirm the location of the code and may verify the authentication mark and that the code number matches an appropriate range for the ink marker being used. The existence of the peaks and the ratio requirements set forth in the association table stored in the database 46 is verified by the control processor 54. Upon verification, the control analyzer provides an indication to the field operator via an output or an I/O unit 60. Alternatively, the verification may be done entirely or partially at a site remote from the spectral analyzer and may be performed at the site of the data base storage 46 or another site. In this case, the spectral data and/or the code data is transferred via modem to the remote site and the results of the comparison with the association table of the data base are transmitted to the field operator and indicated on the output or I/O unit 60.

Another embodiment of the invention is applicable where an object under test already has a visible bar code placed thereon. In such a case, the field operator may simply scan the visible bar code and send this data to the control processor 54 which in turn will query the data base 46 for the location and authentication signature of the invisible bar code or other invisible marking. The control processor 54 provides this location information to the filed operator using the output or I/O device 60. The operator will then be able to locate the invisible marker and shine UV and/or IR irradiation onto the proper location to provide a reading and spectral analysis for confirmation explained above.

The best mode for application on all sorts of media is silicon transfer pad printing. In this process, a silicon transfer pad is pressed against a desired image, for example, a bar code or product logo or any special image, and the inked image is transferred to the silicon transfer pad. The silicon transfer pad is then pressed against the object to be marked. This could be a photo, poster, glove, bat, or virtually any product, new or old. One advantage of silicon transfer pad printing is that it is able to mark all types of things. On shiny items, like glass and metal, and some plastics, the sheen of the ink can be seen against the sheen of the substrate. Mass-produced items may be applied with silicon transfer pad printing, but this would require hand application.

The ink mixtures that are used in the invention are selected do not damage or color the item being marked in any way over time. Inert mixtures are preferred because they meet this criterion. Further, the optical components or taggants (also referred to as markers) that are contained in the ink mixtures are selected to remain stable for long periods of time.

What is claimed is:

1. A method of verifying the authenticity of multiple groups of objects in the field comprising the steps of:

a. illuminating a first group of the objects with one of UV and IR radiation;

b. receiving the reflected one of the UV and IR radiation from each of several of the objects of said first group;

c. performing a spectral analysis of the received, reflected radiation;

d. accessing a data base to retrieve stored spectral authentication information corresponding to the object under test, said spectral authentication information including at least two peaks from different fluorescent markers previously placed on the object in admixture in a clear ink;

e. comparing the accessed data corresponding to the spectral authentication information with the results of the spectral analysis;

f. indicating the results of the comparison; and g. illuminating a second group of the objects with one of UV and IR radiation;

h. receiving the reflected one of the UV and IR radiation from each of several of the objects of said first group;

i. performing a spectral analysis of the received, reflected radiation;

j. accessing a data base to retrieve stored spectral authentication information corresponding to the object under test, said spectral authentication information including at least two peaks from different fluorescent markers previously placed on the object in admixture in a clear ink;

k. comparing the accessed data corresponding to the spectral authentication information with the results of the spectral analysis;

l. indicating the results of the comparison; and m. marking the objects of the first and second groups or selecting such groups to have different spectral authentication information.

2. The method as recited in claim 1, wherein the step of accessing the database includes accessing the database via one of an Internet or an intranet.

3. The method as recited in claim 1 further including the step of performing a threshold comparison of said at least two peaks for objects of each of said first and second groups.

4. The method as recited in claim 3 further including the step of performing a ratio of peak amplitudes and comparing said ratio to a preset value.

5. A method of marking a plurality of objects for authentication comprising the steps of:

a. providing at least first and second markers, said at least first and second markers not visible when exposed to radiation within the visible frequency range and emitting radiation within at least one of the visible, IR, UV and X-ray range when exposed to radiation within a frequency range of at least one of IR, UV and X-ray; each of said at least first and second markers emitting at least one peak within at least one of the frequency range of visible, IR, UV and X-ray, at least one of said peaks defining a first signature for authentication;

b. mixing said at least first and second markers in a clear ink and storing same in a first mixed container;

c. applying said mixed markers from said first mixed container to a first group of said plurality of objects to be marked and authenticated;

d. storing a representation of said first signature together with an ID code identifying said first mixed container and a first range of numbers associated with a first finite group of codes to be applied as first code markings to said first group of said plurality of objects;

e. providing at least third and fourth markers, said at least third and fourth markers not visible when exposed to radiation within the visible frequency range and emitting radiation within at least one of the visible, IR, UV and X-ray range when exposed to radiation within a frequency range of at least one of IR, UV and X-ray; each of said at least third and fourth markers emitting at least one peak within at least one of the frequency range of visible, IR, UV and X-ray, at least one of said peaks defining a second signature for authentication;

f. mixing said at least third and fourth markers in a clear ink and storing same in a second mixed container;

g. applying said mixed markers from said second mixed container to a second group of said plurality of objects to be marked and authenticated; and h. storing a representation of said second signature together with an ID code identifying said second mixed container and a second range of numbers associated with a second finite group of codes to be applied as second code markings to a second group of said plurality of objects.

6. The method as recited in claim 5 wherein said first and second code markings comprise codes applied to said first and second groups of said plurality of objects.

* * * * *